Nov. 30, 1965  V. H. CARDER  3,220,698
HIGH LIFT TRAILER
Filed April 2, 1964
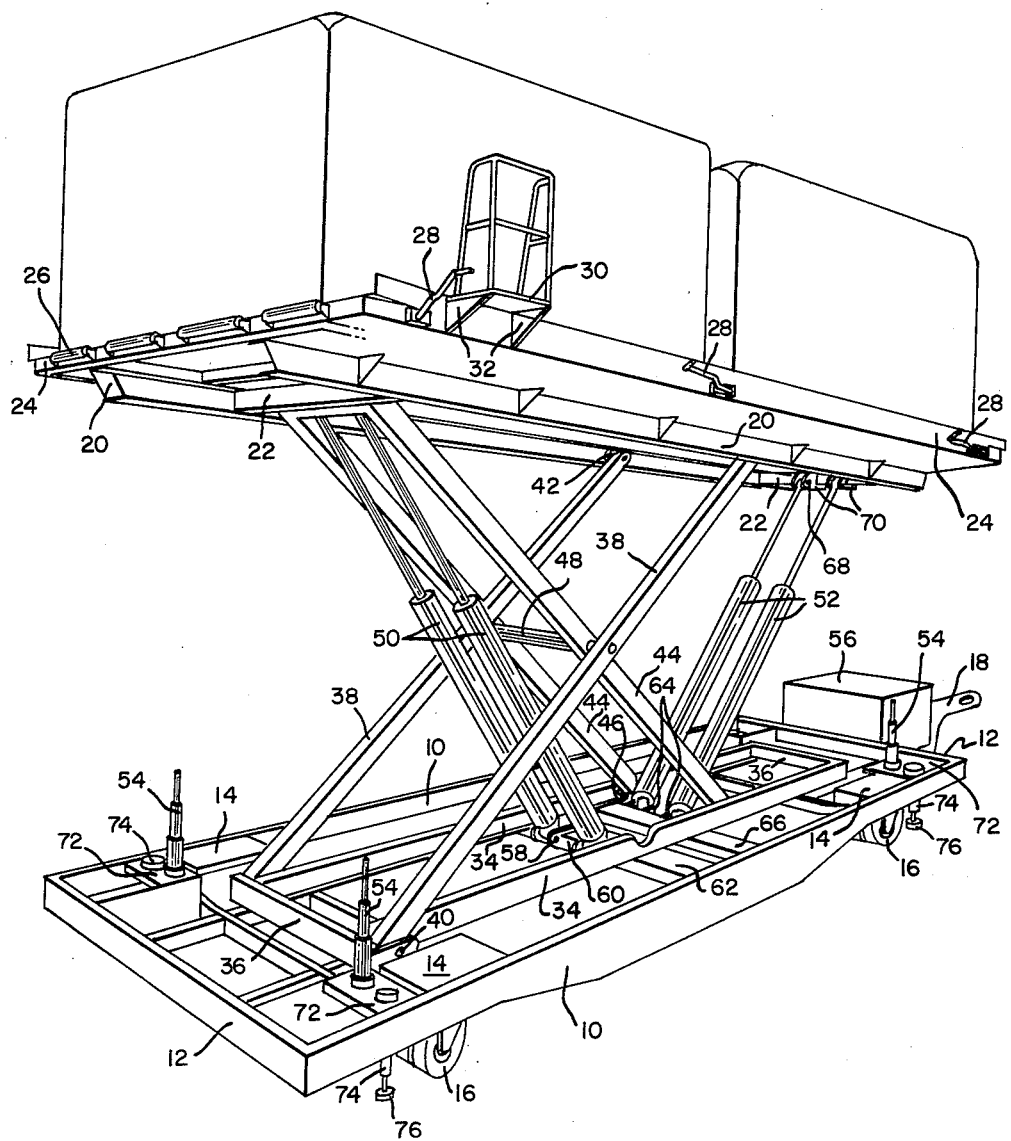
INVENTOR.
VICTOR H. CARDER
BY *Naylor & Neal*
ATTORNEYS

United States Patent Office 3,220,698
Patented Nov. 30, 1965

3,220,698
HIGH LIFT TRAILER
Victor H. Carder, Pacific Grove, Calif., assignor to Cochran Equipment Company, Salinas, Calif., a corporation of California
Filed Apr. 2, 1964, Ser. No. 356,878
1 Claim. (Cl. 254—2)

This invention relates to a portable elevator for loading cargo on aircraft and the like and more particularly to an enlarged low overhead high lift trailer having an expanded load supporting platform.

In a co-pending application of Duane N. McCartney and Victor H. Carder, Serial No. 286,885, filed June 3, 1963, there is disclosed an improved high lift trailer having primary and auxiliary lifting means for facilitating the loading and unloading of freight pallets in aircraft. The present invention relates to improvements in that trailer which result in an improved manner of operation and increased loading capacity for the trailer.

As pointed out in the above identified co-pending application and in a co-pending application of Thomas R. Herrmann, Serial No. 140,516, filed September 25, 1961, now Patent No. 3,164,274, it is desirable in the operation of a high lift trailer of this type to provide a trailer having minimum overhead in its lower position to facilitate handling of cargo thereon at a low level and being capable of rapidly lifting the cargo to a maximum elevation for further handling so that the freight carrying aircraft is delayed for only a minimum time during loading and unloading. These portable elevators work very well in every detail but are capable of receiving only one standard size aircraft freight pallet at a time. Situations inevitably arise where the use of a trailer having an expanded load supporting platform and a heavier payload capacity would produce a considerable savings of time and effort in the freight or cargo handling operation.

The complexity of the design of a trailer of this type precludes merely using an existing chassis in conjunction with a larger than average upper frame to obtain an increased loading capacity. Problems dealing with load stability and distribution, structural support and the effective lift angle of the primary lift rams must all be resolved.

The present invention provides an enlarged low overhead high lift trailer of this type having a larger chassis, upper frame and load supporting platform than heretofore constructed for use in aircraft freight handling operations. The expanded load supporting platform extends over the sides of the upper frame and chassis and can handle two standard size aircraft freight pallets at the same time. The chassis has an interior central rectangular support section for greater load elevating stability and within which four primary lift rams are pivotally connected to the chassis for raising the upper frame after a set of auxiliary rams do the initial lifting. Tilting rams are also provided for laterally tilting the trailer to conform to pitching of the aircraft during loading and unloading.

Other advantages of the invention will become apparent from the following description read in conjunction with the attached drawing in which:

The single figure is a perspective view of an enlarged low overhead high lift trailer constructed in accordance with the principles of this invention and illustrating the expanded load supporting platform in a raised position with two standard size aircraft freight pallets thereon.

Referring now in detail to the drawing, the enlarged low overhead high lift trailer illustrated therein includes a lower section having a generally rectangular chassis with chassis side frame members 10 and end frame members 12 which support wheel wells 14 and ground engaging wheels 16 for supporting the chassis closely adjacent to the ground. Trailer hitch member 18 is provided on the front end frame member 12 for permitting towing of the trailer in a predetermined direction parallel to the side frame members 10.

An upper section has an upper frame having substantially parallel channel members 20 and lateral members 22 for supporting an expanded load supporting platform or bed which transversely overlaps the upper and lower sections, the platform having lateral and longitudinal members 24 which together define a lattice which is substantially coextensive with the plan area of the platform for supporting a plurality of anti-friction rollers 26 for facilitating delivery of a load of freight to the platform from one end thereof and delivery off the platform from the other end thereof. A plurality of operating handles 28 are mounted on the load supporting platform for manipulating suitable pallet stops (not shown) to restrain the freight pallets longitudinally. The pallet stops are similar to those disclosed in the co-pending application of Duane N. McCartney and Victor H. Carder, Serial No. 286,884, filed June 3, 1962. Additionally, the operator's platform is mounted near the rear of the platform on the right side of brackets 32 to provide a station for an operator when raising and lowering cargo.

The chassis has an interior central rectangular support section for greater load elevating stability having longitudinal channel members 34 and end members 36. The expanded load supporting platform is maintained parallel to the chassis at all positions by two pairs of scissors lift arms with one pair of generally parallel arms 38 each having a lower end pivotally connected by shaft 40 to the rear end member 36 of the interior support section and an upper end with a roller 42 mounted thereon for slidably engaging upper frame channel member 20; and a second pair of generally parallel arms 44 each having an upper end pivotally connected to lateral member 22 and a lower end with a roller 46 mounted thereon for slidably engaging channel member 34 of the central support section. The scissors arms are pivotally connected at a point intermediate their ends by a pivot shaft 48, and the inner arm of each pair of scissor arms is spaced inwardly from the outer arm by a spacer (not shown) which is of a width at least as great as the width of longitudinal channel members 34 and which permits the scissors arms of each pair to assume a position parallel to each other when the platform is fully lowered.

The lifting thrust for raising the platform above the chassis while the platform is maintained in a horizontal position by the scissors arms is provided by two pairs of primary hydraulic lift rams 50 and 52 and auxiliary or secondary rams 54 which are all connected to a power unit 56. The primary rams are pivotally connected to the chassis within the central support section and pivotally connected to the upper section at each end thereof. One pair of primary hydraulic rams 50 is pivotally connected centrally to the chassis at pivot pins 58 on brackets 60 which are in turn mounted on a transverse cross-brace 62 spanning side frame members 10 and positioned below and supporting longitudinal channel members 34. The upper end of the ram pair 50 is pivotally connected to the nearest end of the platform on lateral member 22. The other pair of primary hydraulic rams 52 is pivotally connected centrally to the chassis on brackets 64 mounted on transverse cross-brace 66. The upper end of the ram pair 52 is pivotally connected to the upper section at pivot pins 68 on brackets 70 mounted on lateral member 22. The use of four primary lift rams and the sliding scissors arms maintains a balanced load upon the chassis.

The auxiliary rams 54 are each mounted in a bracket 72 in the lower section near a wheel well 14 and adjacent to each corner of the chassis underneath the upper load supporting bed and positioned to engage the channel members 20 of the upper section when the upper section is lowered to a position approaching the lower section. Also mounted in brackets 72 are tilt rams 74 which face downward and have an engaging surface 76 to act against the ground as disclosed in a co-pending application filed herewith. The double acting rams 74 function in pairs for laterally tilting the unit and are capable of lifting the entire unit with a heavy cargo thereon to lock the trailer in place on the ground and tilt the trailer to compensate for pitching of the aircraft during loading and unloading.

The power unit 56 is mounted on a swinging arm (not shown) which pivots on a bracket attached to front end frame member 12. In this manner the power unit may be swung from a position over the loading supporting platform when the platform is in its lowered position to alternative positions outboard of the platform during operation of the trailer.

An operator standing on platform 30 controls the raising and lowering and tilting of the unit by means of control switches mounted on the end of a long flexible cable (not shown). When hydraulic fluid is supplied to the unit while the upper section is in its lower position, the auxiliary rams 54 lift the upper section to a sufficient intermediate height so that the pairs of primary rams 50 and 52 are positioned at a substantial effective lifting angle before take over and lifting the upper section away from the auxiliary rams 54 and upwardly toward the high lift position. The design of this trailer makes it possible by using a minimum sized cylinder and length of shaft to position the lower end of a pair of rams sufficiently close to the auxiliary rams to insure an advantageous lifting angle and still lift the expanded load supporting platform to the required height. An operator may also laterally tilt the unit in either direction as desired.

The upper load supporting platform on the enlarged low overhead high lift trailer constructed in accordance with the principles of this invention is 127 inches in width and 254 inches in length so that it can easily handle simultaneously two standard size aircraft freight pallets which are 88 inches by 125 inches. Pallet stops are provided in the middle of the platform to position the pallets apart from each other and to support a single pallet when only one pallet is to be lifted at any one time. The load lifting capacity of the unit is 12,000 pounds.

The use of the two sets of rams 50 and 52 on this long rectangular arrangement of the high lift trailer provides excellent load distribution on the lower frame of the trailer with the load substantially centered in both static and dynamic conditions. The load distribution may be further enhanced by employing a pair of scissors lift arm combinations (eight arms) with a pair of arms pivotally connected to each end of each of the upper and lower frames slidably engaging the centers of the channels 20 and 34, but where high lift of the trailer is desired, it is preferable to employ the single scissors lift arm combination since the longer arms permit lifting to greater heights.

While one specific embodiment of the invention has been illustrated and described in detail herein, it is obvious that many modifications thereof may be made without departing from the spirit and scope of the invention.

What is claimed is:

An enlarged low overhead high lift trailer comprising:
a generally rectangular chassis having ground engaging wheels for supporting said chassis closely adjacent to the ground,
an interior central rectangular support section permitting increased load elevating stability and having a pair of longitudinal channel members,
an upper load carrying bed positioned immediately on top of and transversely overlapping said chassis,
a pair of longitudinal channel members mounted on said bed with the channel members of said pairs lying in substantially the same plane underneath said bed,
two pairs of scissors lift arms with one end of one pair of said arms pivotally connected to said interior central rectangular support section and one end of the other pair of said arms pivotally connected to said bed and the other ends of said pairs of arms slidably engaging a channel of each of said pairs,
four auxiliarly rams with one mounted adjacent to each corner of said chassis underneath said bed for upward expansion responsive to the delivery of pressurized fluid thereto to lift said bed above said chassis,
two pairs of primary lift rams pivotally connected centrally to said chassis within said interior central rectangular support section with one pair of said primary lift rams pivotally connected to the nearest end of said bed and the other pair of said primary lift rams pivotally connected to the opposite end of said bed for pushing said bed and chassis further apart after said auxiliary rams have expended responsive to the delivery of pressurized fluid thereto,
and fluid pressure supply means connected to said auxiliary and primary rams.

References Cited by the Examiner

UNITED STATES PATENTS

| | | | |
|---|---|---|---|
| 1,985,169 | 12/1934 | Howell et al. | 214—512 X |
| 2,527,369 | 10/1950 | Meyer | 298—11 |
| 2,617,547 | 11/1952 | Pridy | 214—512 X |
| 2,714,967 | 8/1955 | Olsen | 214—84 X |
| 2,764,869 | 10/1956 | Scherr | 214—512 X |
| 2,899,172 | 8/1959 | Cresci | 254—8.6 |
| 2,829,863 | 4/1958 | Gibson | 254—8.6 |

GERALD M. FORLENZA, *Primary Examiner.*

HUGO O. SCHULZ, *Examiner.*